United States Patent
Stirling-Gallacher et al.

(10) Patent No.: US 11,888,665 B2
(45) Date of Patent: *Jan. 30, 2024

(54) SOUNDING REFERENCE SIGNAL (SRS) DESIGN FOR CELLULAR TIME DIVISION DUPLEX (TDD) MMWAVE SYSTEMS

(71) Applicant: Futurewei Technologies, Inc., Addison, TX (US)

(72) Inventors: Richard Stirling-Gallacher, San Diego, CA (US); Nathan Edward Tenny, San Diego, CA (US); Bin Liu, San Diego, CA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,088

(22) Filed: Nov. 18, 2022

(65) Prior Publication Data

US 2023/0081802 A1 Mar. 16, 2023

Related U.S. Application Data

(63) Continuation of application No. 15/139,987, filed on Apr. 27, 2016, now Pat. No. 11,522,743.

(51) Int. Cl.
*H04L 27/26* (2006.01)
*H04B 7/08* (2006.01)
(Continued)

(52) U.S. Cl.
CPC ......... *H04L 27/261* (2013.01); *H04B 7/0695* (2013.01); *H04B 7/08* (2013.01);
(Continued)

(58) Field of Classification Search
CPC ... H04L 27/261; H04L 5/0048; H04L 5/1469; H04B 7/0695; H04B 7/08
(Continued)

(56) References Cited

U.S. PATENT DOCUMENTS 9,077,415 B2 7/2015 Josiam et al.
9,154,284 B1 10/2015 Park et al.
(Continued)

FOREIGN PATENT DOCUMENTS

CN 103052161 A 4/2013
CN 103503331 A 1/2014
(Continued)

OTHER PUBLICATIONS

3rd Generation Partnership Project; Technical Specification Group Radio Access Network; Evolved Universal Terrestrial Radio Access (E-UTRA); Physical channels and modulation (Release 13), 3GPP TS 36.211, Dec. 2015, 141 Pages, v13.0.0.
(Continued)

*Primary Examiner* — Leila Malek
(74) *Attorney, Agent, or Firm* — Slater Matsil, LLP

(57) ABSTRACT

A system and method of communicating sounding reference signals (SRSs) in a cellular time division duplex (TDD) mmWave system. A transmission point (TP) may transmit beamformed reference signals to a user equipment (UE), each of the beamformed reference signals having been transmitted according to a beam direction in a set of beam directions available to the TP. The TP may receive a feedback message from the UE that identifies one of the beamformed reference signals transmitted to the UE. The TP may select, from the set of beam directions available to the TP, a subset of beam directions for SRS reception based on the feedback message received from the UE, and receive uplink SRS signals according to beam directions in the subset of beam directions. The set of beam directions available to the TP includes at least one beam direction that is excluded from the subset of beam directions.

21 Claims, 11 Drawing Sheets

(51) Int. Cl.
  *H04L 5/14* (2006.01)
  *H04L 5/00* (2006.01)
  *H04B 7/06* (2006.01)
(52) U.S. Cl.
  CPC .......... *H04B 7/088* (2013.01); *H04L 5/0048* (2013.01); *H04L 5/1469* (2013.01)
(58) Field of Classification Search
  USPC ........................................................ 375/260
  See application file for complete search history.

(56) References Cited

U.S. PATENT DOCUMENTS

| | | | |
|---|---|---|---|
| 9,913,237 | B2 | 3/2018 | Webb et al. |
| 10,064,219 | B2 | 8/2018 | Jung et al. |
| 2011/0090862 | A1 | 4/2011 | Liang et al. |
| 2012/0281555 | A1 | 11/2012 | Gao et al. |
| 2013/0301567 | A1 | 11/2013 | Jeong et al. |
| 2014/0241242 | A1 | 8/2014 | Josiam et al. |
| 2015/0009951 | A1* | 1/2015 | Josiam ................ H04L 25/0224 370/330 |
| 2015/0208443 | A1* | 7/2015 | Jung ................ H04W 74/0833 370/329 |
| 2015/0257073 | A1 | 9/2015 | Park et al. |
| 2015/0295743 | A1 | 10/2015 | Hwang et al. |
| 2015/0358102 | A1* | 12/2015 | Ko ........................ H04J 11/0053 370/252 |
| 2016/0006122 | A1 | 1/2016 | Seol et al. |
| 2016/0056871 | A1 | 2/2016 | Kakishima et al. |
| 2016/0080060 | A1 | 3/2016 | Yu et al. |
| 2016/0174244 | A1 | 6/2016 | Kim et al. |
| 2017/0019161 | A1 | 1/2017 | Wang et al. |
| 2017/0195033 | A1 | 6/2017 | Zhang et al. |

FOREIGN PATENT DOCUMENTS

| | | |
|---|---|---|
| CN | 103905105 A | 7/2014 |
| CN | 104780023 A | 7/2015 |
| CN | 104955061 A | 9/2015 |
| CN | 105322989 A | 2/2016 |
| GB | 2479856 A | 11/2011 |
| JP | 2015509305 A | 3/2015 |
| JP | 2015516736 A | 6/2015 |
| JP | 2015532805 A | 11/2015 |
| RU | 2440695 C1 | 1/2012 |
| WO | 2014133311 A1 | 9/2014 |
| WO | 2015080645 A1 | 6/2015 |
| WO | 2016021541 A1 | 2/2016 |
| WO | 2016044991 A1 | 3/2016 |

OTHER PUBLICATIONS

3GPP, LTE; Evolved Universal Terrestrial Radio Access (E-UTRA); Physical layer procedures (3GPP TS 36.213 version 11.2.0 Release 11), ETSI TS 136 213 V11.2.0, Apr. 2013, 175 pages.
Nam, Y., et al., "Evolution of Reference Signals for LTE-Advanced Systems," IEEE Communications Magazine, vol. 50, No. 2, Feb. 2012, pp. 132-138.
3GPP, "SRS Capacity Enhancements" 3GPP TSG-RAN WG1 #82, R1-153881, Aug. 24-28, 2015, pp. 1-4.
3GPP, "Discussion on SRS Capacity Improvement," 3GPP TSG RAN WG1 Meeting #82, R1-154384, Aug. 24-28, 2015, pp. 1-5.
3GPP, "SRS Enhancements for EB/FD-MIMO." 3GPP TSG RAN WG1 Meeting #82, R1-153936, Aug. 24-28, 2015, pp. 1-3.
3GPP, "Discussion on SRS Capacity Improvement," 3GPP TSG RAN WG1 Meeting #82, R1-154275, Aug. 24-28, 2015, pp. 1-3.
3GPP, LTE; Evolved Universal Terrestrial Radio Access (E-UTRA); Physical channels and modulation (3GPP TS 136 211 V 11.0.0 Release 11), Oct. 2012, 108 pages.

* cited by examiner

SOUNDING REFERENCE SIGNAL (SRS) DESIGN FOR CELLULAR TIME DIVISION DUPLEX (TDD) MMWAVE SYSTEMS

CROSS-REFERENCE TO RELATED APPLICATIONS

This application is a continuation of U.S. application Ser. No. 15/139,987, filed on Apr. 27, 2016, now U.S. Pat. No. 11,522,743 issued on Dec. 6, 2022, entitled "Sounding Reference Signal (SRS) Design for Cellular Time Division Duplex (TDD) mmWave Systems," application of which is hereby incorporated by reference in its entirety.

TECHNICAL FIELD

The present invention relates generally to managing the allocation of resources in a network, and in particular embodiments, to techniques and mechanisms for sounding reference signal (SRS) design for cellular time division duplex (TDD) mmWave systems.

BACKGROUND

Wireless signals communicated using carrier frequencies between 30 Gigahertz (GHz) and 300 GHz are commonly referred to as millimeter Wave (mmW) signals. There are a variety of telecommunication standards that define protocols for communicating mmWave signals for non-cellular scenarios. One such example is Institute of Electrical and Electronics Engineers (IEEE) 802.11ad, which defines a protocol for communicating wireless signals over a 60 GigaHertz (GHz) carrier frequency. Due to the attenuation characteristics of wireless signals exceeding 6 GHz, mmWave signals tend to exhibit high, oftentimes unacceptable, packet loss rates when transmitted over relatively long distances (e.g., distances exceeding one kilometer), and consequently have been primarily for short-range communications or non-cellular type communications. By way of example, IEEE 802.11ad is generally considered to have a coverage range of approximately ten meters.

SUMMARY OF THE INVENTION

Technical advantages are generally achieved, by embodiments of this disclosure which describe sounding reference signal (SRS) design for cellular time division duplex (TDD) mmWave systems.

In accordance with an embodiment, a method for SRS design for TDD mmWave systems is provided, as may be performed by a user equipment (UE). In this example, the method includes receiving one or more signals from a transmit point (TP) according to one or more beam directions in a set of beam directions available to the UE. The method further includes selecting, from the set of beam directions available to the UE, a subset of beam directions for SRS transmission based on the one or more signals. The set of beam directions available to the UE includes at least one beam direction that is excluded from the subset of beam directions selected for SRS transmission. The method further includes transmitting uplink SRS signals to the TP according to beam directions in the subset of beam directions selected for uplink SRS transmission without using the at least one beam direction excluded from the subset of beam directions. An apparatus for performing this method is also provided.

In accordance with another embodiment, another method for SRS design for TDD mmWave systems is provided, as may be performed by a transmit point (TP). In this example, the method includes transmitting beamformed reference signals to a user equipment (UE), each of the beamformed reference signals having been transmitted according to a beam direction in a set of beam directions available to the TP, and receiving a feedback message from the UE, the feedback message identifying one or more of the beamformed reference signals transmitted to the UE. The method further includes selecting, from the set of beam directions available at the TP, a subset of beam directions for SRS reception based on the feedback message received from the UE. The set of beam directions available at the TP includes at least one beam direction that is excluded from the subset of beam directions selected for SRS reception. The method further includes receiving uplink SRS signals from the UE according to beam directions in the subset of beam directions selected for uplink reception without using the at least one beam direction excluded from the subset of beam directions. An apparatus for performing this method is also provided.

In accordance with another embodiment, a base station configured to communicate sounding reference signals (SRSs) in a cellular time division duplex (TDD) mmWave system is provided. In this example, the base station includes a processor and a non-transitory computer readable storage medium storing programming for execution by the processor. The programming includes instructions to transmit beamformed reference signals to a user equipment (UE), each of the beamformed reference signals having been transmitted according to a beam direction in a set of beam directions available to the base station, and to receive a feedback message from the UE, the feedback message identifying one or more of the beamformed reference signals transmitted to the UE. The programming further includes instructions to select, from the set of beam directions available to the base station, a subset of beam directions for SRS reception based on the feedback message received from the UE. The set of beam directions available to the base station includes at least one beam direction that is excluded from the subset of beam directions selected for SRS reception. The programming further includes instructions to receive uplink SRS signals from the UE according to beam directions in the subset of beam directions selected for uplink reception without using the at least one beam direction excluded from the subset of beam directions.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
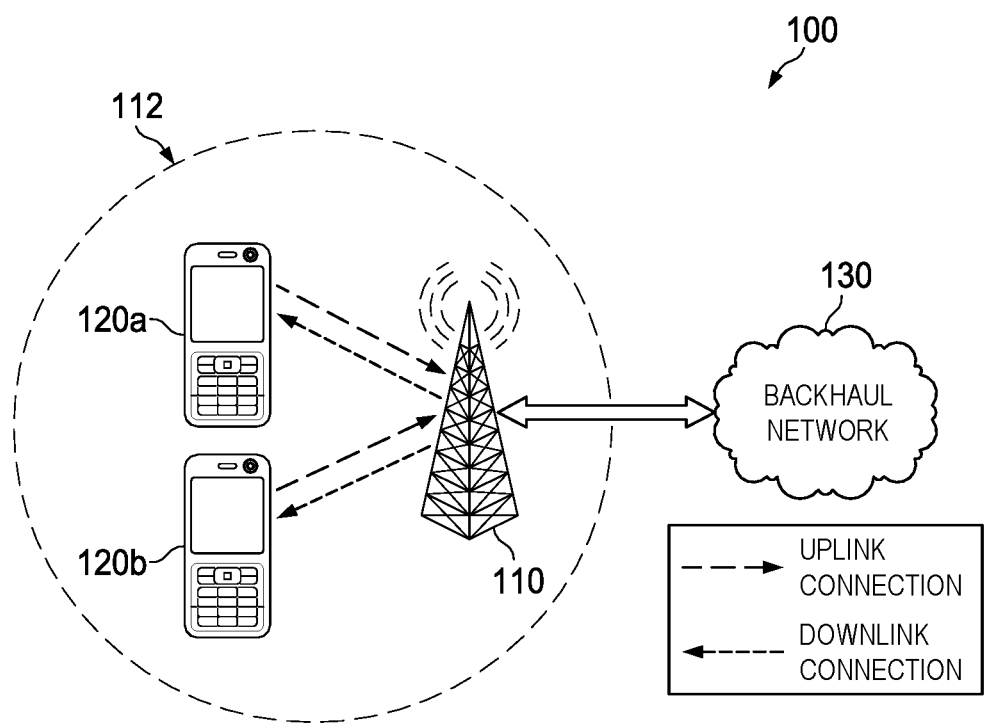
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In long term evolution (LTE) networks, user equipments (UEs) transmit sounding reference signals (SRSs) to base stations so that the base stations may estimate the complex channel response for the downlink channels. The estimated channel responses may then be used to determine beams over which to communicate corresponding downlink transmissions to the UEs. As used herein, the term "beam" refers to a set of beamforming weights (e.g., amplitude/phase shifts for antenna elements of a phased array antenna) that are used for directional signal transmission and/or reception. In general, beamforming is only performed by the base station in LTE networks.

Unlike LTE networks, beamforming in mmWave systems may typically be performed by both the base station and the UE in order to achieve commercially acceptable levels of throughput and range over higher carrier frequencies. Accordingly, SRS transmission schemes for mmWave systems may need to identify beams to be used by both the UE and the base station to reduce the SRS sounding overhead. A beam may be a pre-defined set of beamforming weights in the context of codebook-based precoding or a dynamically defined set of beamforming weights in the context of non-codebook based precoding (e.g., Eigen-based beamforming (EBB)). It should be appreciated that a UE may rely on codebook-based precoding to transmit uplink signals and receive downlink signals, and a base station may rely on non-codebook based precoding (e.g., Eigen-based beamforming (EBB)) forming a certain radiation pattern to transmit downlink signals.

One SRS configuration technique relies on codebook-based precoding to estimate the complex channel response. According to that technique, a UE performs SRS transmissions according to different beam directions (e.g., codewords) in a set of beam directions (e.g., a codebook) available to the UE. The base station then receives the beamformed SRS transmissions from the UE according to different beam directions (e.g., codewords) in a set of beam directions (e.g., codebook) available to the base station, and estimates the complex channel response based on the received SRS transmissions. The complex channel response may then be used to determine beams (codebook or non-codebook based) which the base station uses to transmit downlink signals, as well as to determine a beam direction(s) which the UE uses to receive downlink signals.

Traditional mmWave SRS configuration schemes may evaluate all combinations of beam directions between the set of beam directions available to the UE and the set of beam directions available to the base station. By way of example, if nine beam directions are in the set of beam directions available to the base station and six beam directions are available to the UE, then fifty-four combinations would be evaluated according to traditional SRS configuration schemes. Evaluating so many different combinations of beam directions may introduce significant overhead and latency into the SRS configuration process.

Aspects of this disclosure reduce overhead and latency during SRS configuration by evaluating fewer than all combinations of beam directions between a set of beam directions available to a UE and a set of beam directions available to a base station. In one embodiment, a UE receives one or more signals from a base station according to one or more beam directions in a set of beam directions available to the UE. The UE may then select a subset of beam directions from the set of beam directions available to the UE for SRS transmission based on the received signals. The UE may then transmit uplink SRS signals to the base station according to the subset of beam directions. In another embodiment, a base station may transmit beamformed reference signals to a UE. The base station may then receive at least one beam index from the UE identifying one or more of the beamformed reference signals, and then select a subset of beam directions from a set of beam directions available to the base station for SRS reception based on the index in the feedback message. The base station may then receive uplink SRS transmissions from the UE according to the subset of beam directions selected for uplink reception. Embodiment SRS configuration schemes may reduce uplink SRS overhead, which in turn may facilitate the possibility of more frequent SRS reporting to support higher UE mobility and/or an increased number of UEs being multiplexed in the available SRS resources. It should be noted that although the present disclosure uses mmWave communications systems and devices as a preferred embodiment, the technologies disclosed herein may be applied to wireless communications systems operating at any frequency (e.g., 3 GHz-300 GHz) where beam-forming is used. Therefore, the discussion of mmWave communications systems should not be construed as being limiting to either the scope or the spirit of the present disclosure. These and other aspects are disclosed in greater detail below.

FIG. 1 illustrates a network 100 for communicating data. The network 100 comprises an base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data carried over the uplink/downlink connections may include data communicated between the UEs 120, as well as data communicated to/from a remote-end (not shown) by way of the backhaul network 130. As used herein, the term "base station" refers to any component (or collection of components) configured to provide wireless access to a network, such as a macro-cell, a femtocell, a Wi-Fi access point (AP), or other wirelessly enabled devices. Wireless access may be provided in accordance with one or more wireless communication protocols, e.g., long term evolution (LTE), LTE advanced (LTE-A), High Speed Packet Access (HSPA), Wi-Fi 802.11a/b/g/n/ac, etc. The term "transmit point" refers to any device configured to transmit a beamformed signal. The term "user equipment (UE)" refers to any component (or collection of components) capable of establishing a wireless connection with a base station, such as a mobile device, a mobile station (STA), and other wirelessly enabled devices. In some embodiments, the network 100 may comprise various other wireless devices, such as relays, low power nodes, etc.

Figure 2:
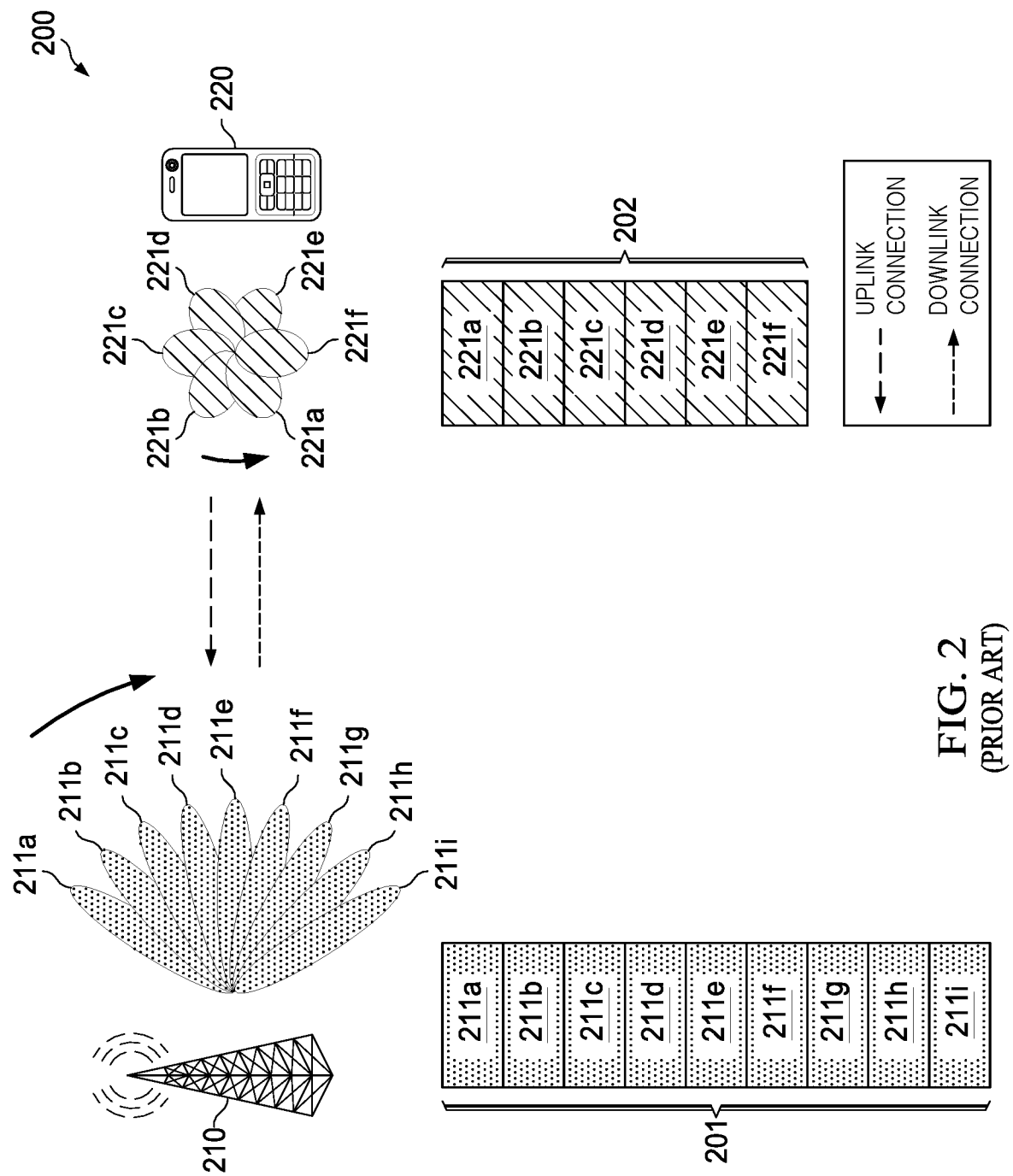
FIG. 2 illustrates a diagram of a conventional mmWave SRS transmission scheme.

FIG. 2 illustrates a diagram of a conventional SRS transmission scheme 200, as may be performed in an mmWave system. As shown, the UE 220 cycles through all of the beam directions 221a-221f in the set of beam directions 202 available to the UE 220 when performing SRS transmissions. The base station 210 also cycles through all of the beam directions 211a-211f in the set of beam directions 201 available to the base station 210 when receiving SRS transmissions. In conventional SRS transmission schemes, each combination of beam directions between the set of beam directions 201 available to the base station and the set of beam directions 202 available to the UE 292 are evaluated. For example, if the base station 210 can receive SRS transmissions over three beam directions (e.g., 211a-211c, 211d-211f, or 211g-211i, respectively) at the same time, and that the UE 220 can perform SRS transmissions over one beam direction at a time, then a total number of eighteen SRS opportunities (e.g., uplink resources) may be needed to evaluate all combinations of beam directions between the set of beam directions 201 available to the base station and the set of beam directions 202. The base station 210 may use the received SRS transmissions to estimate a complex channel response for the downlink between the base station 210 and the UE 220 (via the uplink SRS). The estimated channel response may then be used to determine a beam (code book or non-code book) for which the base station 210 subsequently transmits downlink signals to the UE 220, as well as a beam(s) for the UE so that the UE 220 can receives downlink signals from the base station 210.

Figure 3:
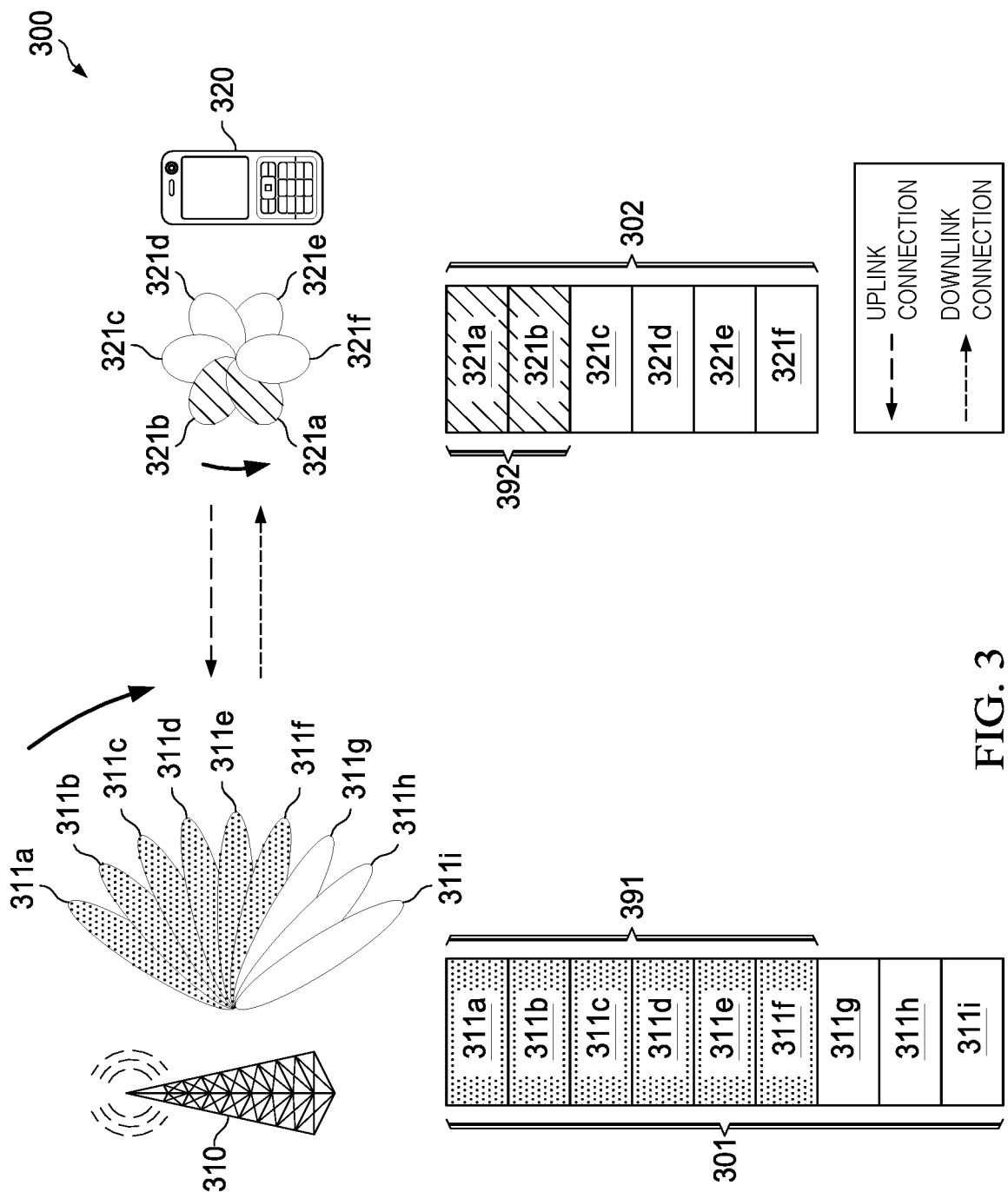
FIG. 3 illustrates a diagram of an embodiment mmWave SRS transmission scheme.

FIG. 3 illustrates a diagram of an embodiment beamformed SRS transmission scheme 300, as may be performed in an mmWave system. In this example, only a subset of beam directions 392 (i.e., 321a-321b) in the set of beam directions 302 available to the UE 320 is selected for performing SRS transmissions; likewise, only a subset of beam directions 391 (i.e., 311a-311f) in the set of beam directions 301 available to the base station 310 is selected for receiving SRS transmissions. Hence, in the embodiment beamformed SRS transmission scheme 300, each combination of beam directions between the subsets of beam directions, 391, 392 are evaluated. The UE 320 may select the subset of beam directions 392 based on a downlink signal received from the base station 310. The downlink signal may be a synchronization signal, a broadcast signal, a data signal, or some other type of signal. In one example, the downlink signal is a beamformed mmWave signal. In such an example, the mmWave signal may be transmitted over one or more of the beam directions 311a-311i. Alternatively, the mmWave signal may be transmitted over a different beam, e.g., a beam having a wider primary lobe, a beam having multiple lobes, etc. In yet other examples, the downlink signal may be communicated over lower frequencies, such as a control signaling message that indicates which beams to should be included in the subset of beam directions 392 used for SRS transmission by the UE 320. The selection of the subset of beam directions 391 at the base station may be performed by the base station 310 based on an uplink feedback message received from the UE 320, such as a beamformed reference signal feedback message (e.g., feedback based on a beamformed CSI-RS).

Using the subsets of beam directions 391, 392 for SRS transmission/reception may significantly reduce the number of SRS transmissions opportunities that are allocated to the UE 320. For example, if the base station 310 can receive SRS transmissions over three beam directions at the same time, and that the UE 320 can perform SRS transmissions over one beam direction at a time, then only four SRS sounding opportunities would need to be allocated to the UE 320, which is significantly fewer sounding opportunities than allocated to the UE 220 in the conventional SRS transmission scheme 200 depicted in FIG. 2.

Figure 4:
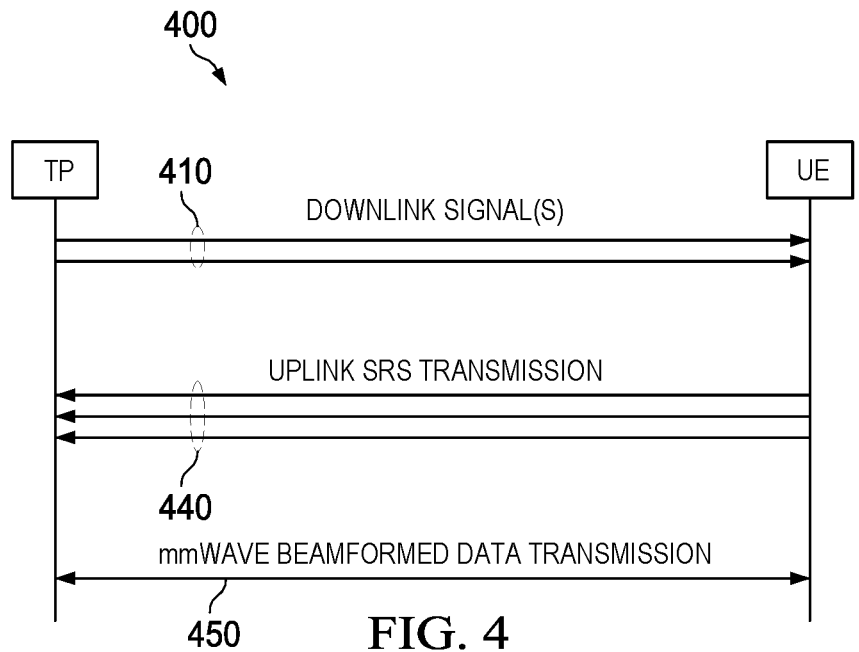
FIG. 4 illustrates a protocol diagram of an embodiment communications sequence for mmWave SRS transmission.

Embodiments of this disclosure provide techniques selecting a subset of beam directions to be used by a UE when performing downlink SRS transmissions. FIG. 4 illustrates a protocol diagram of an embodiment communications sequence 400 for downlink SRS transmissions. As shown, a base station transmits one or more downlink signals 410 to a UE. The downlink signals 410 may include any type of downlink signal, such as a downlink synchronization signal, broadcast signal, data signal, cell-specific SRS configuration message, and/or UE specific SRS configuration message. The downlink signals 410 may be beam-formed mmWave signals. Alternatively, the downlink signals may be lower frequency signals (e.g., signals communicated over a legacy LTE carrier) when the UE is operating in a dual connectivity mode.

The UE then selects a subset of beam directions from a set of beam directions available to the UE based on the one or more downlink signals 410 and performs uplink SRS transmissions 440 according to the subset of beam directions. In some embodiments, the UE receives the downlink signals 410 based on one or more beam directions, and then selects the subset of beam directions based on a received signal quality level of the received signals. In another embodiment, the downlink signal specifies the subset of beam directions that the UE is to use when performing the uplink SRS transmissions 440. In some embodiments, the UE determines a number of SRS transmission opportunities allocated to the UE based on an SRS parameter carried in the SRS configuration from the TP (either in the downlink signals 410 or in a configuration message separate from the downlink signals 410), and then selects a number of beam directions for inclusion in the subset of beam directions based on the number of SRS transmission opportunities allocated to the UE.

When the SRS configuration message is a cell-specific SRS configuration message, the SRS configuration message may carry SRS configuration parameters specifying at least one of a maximum number of SRS sounding opportunities for different beams, a number of times each UE beam needs to be re-transmitted, and a frequency comb spacing. When the SRS configuration message is a UE-specific SRS configuration message, the SRS configuration message may carry an SRS configuration parameter specifying at least one of a sub-carrier offset assigned to the UE, a code sequence or offset assigned to the UE, an SRS sub-frame sounding time assigned to the UE, a number of times each UE beam needs to be re-transmitted, a frequency comb spacing assigned to the UE, a time/frequency multiplexing flag assigned to the UE, and base station beam indices for each assigned time period sounding time assigned to the UE. The time/frequency flag may indicate whether or not SRS transmissions from different radio frequency (RF) chains of the UE should be multiplexed in the time-domain or the frequency domain, for example in the frequency domain in accordance with the frequency comb spacing. When values of the same SRS configuration parameter in the cell-specific and the UE-specific SRS configuration messages are different, the UE may use the value of the SRS configuration parameter in the UE-specific SRS configuration message for SRS configuration.

Figure 5:
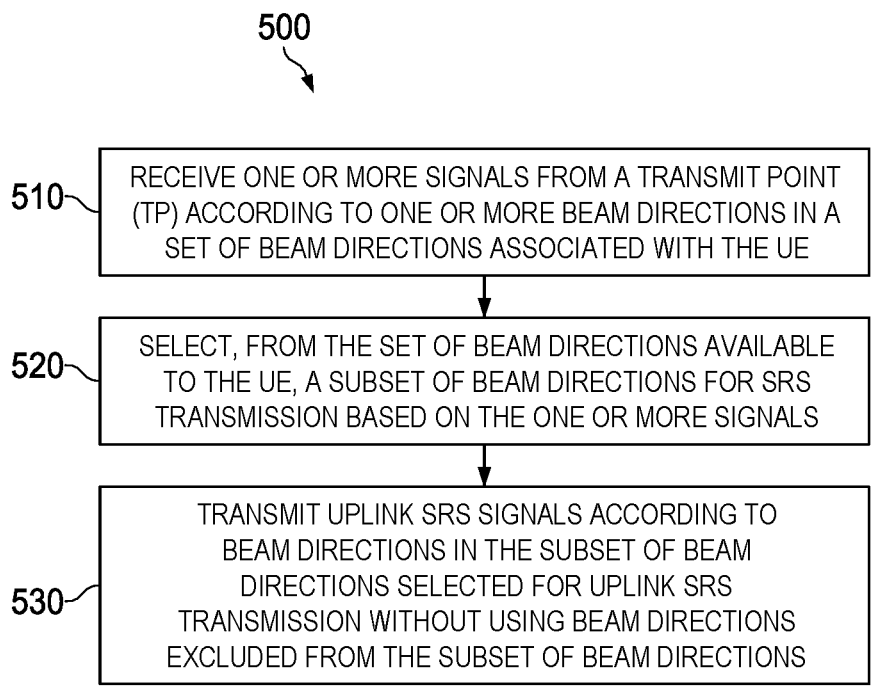
FIG. 5 illustrates a flowchart of an embodiment method for performing beamformed SRS transmissions over a subset of beam directions.

FIG. 5 illustrates an embodiment method 500 for performing beamformed SRS transmission, as may be executed by a UE. At step 510, the UE receives one or more downlink signals from a transmit point (TP) according to one or more beam directions in a set of beam directions available to the UE. In an embodiment, the one or more signals comprise at least one of a downlink synchronization signal, a broadcast signal, or a data signal. At step 520, the UE selects a subset of beam directions for SRS transmission from the set of beam directions available to the UE based on the one or more signals, for example based on the downlink signals associated with the best received signal quality. The set of beam directions available to the UE may include at least one beam direction that is excluded from the subset of beam directions selected for SRS transmission.

At step 530, the UE transmits uplink SRS signals to the TP according to beam directions in the subset of beam directions selected for uplink SRS transmission without using the at least one beam direction excluded from the subset of beam directions. In an embodiment, the UE receives an SRS configuration message from the TP, determines how many SRS transmission opportunities are allocated to the UE, and selects the subset of beam directions for uplink SRS transmission based on the number of SRS transmission opportunities allocated to the UE based on an SRS parameter carried in the SRS configuration message.

Figure 6:
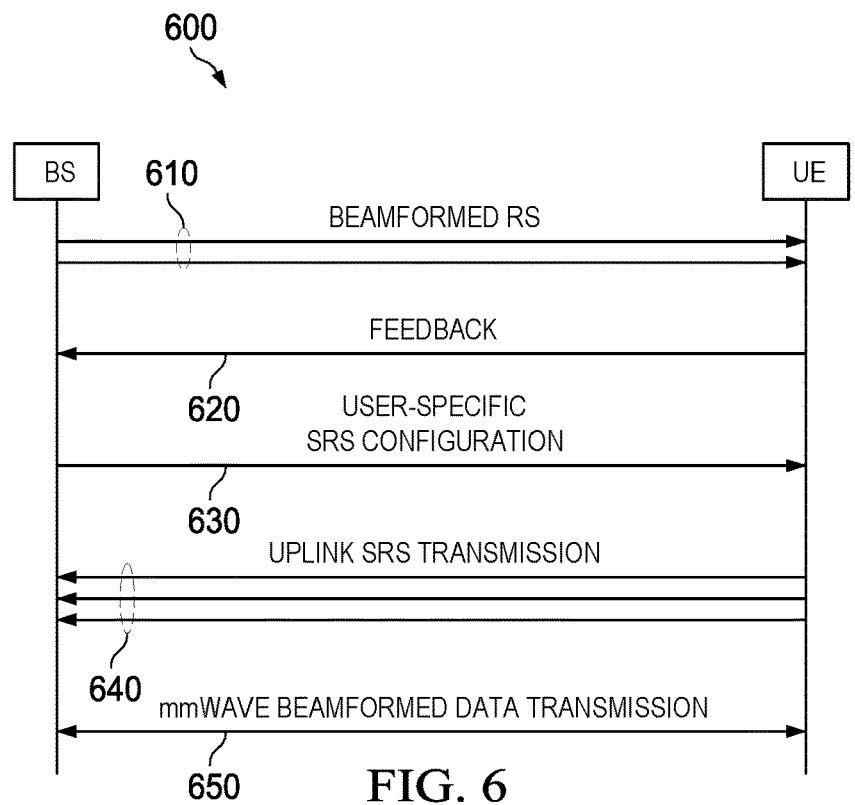
FIG. 6 illustrates a protocol diagram of yet another embodiment communications sequence for mmWave SRS transmission.

Embodiments of this disclosure further provide techniques selecting a subset of beam directions to be used by a base station for receiving downlink SRS transmissions. FIG. 6 illustrates a protocol diagram of an embodiment communications sequence 600 for downlink SRS transmissions. As shown, a base station transmits one or more beamformed reference signals 610 to a UE according to one or more beams. The beamformed reference signals 610 may be channel state information-reference signals (CSI-RSs). In an embodiment, each of the beamformed reference signals 610 are transmitted using a different beam. In such an embodiment, each beamformed reference signal may comprise a beam index number associated with the corresponding beam. The UE selects one or more of the beamformed reference signals, and then transmits a feedback message 620 to the base station identifying the one or more selected beamformed reference signals. The UE may select one or more of the beamformed reference signals 610 based on a selection criteria. For example, the UE may select the beamformed reference signal providing the best received signal quality, such as the highest received signal power level(s), the highest received signal to interference ratio(s), and/or the highest received signal to noise ratio(s). The corresponding signal quality information (e.g., channel quality information (CQI)) may also be communicated to the base station via the feedback message 620. The feedback message 620 may be an mmWave signal. Alternatively, the feedback message 620 may be a lower frequency signal (e.g., a signal communicated over a legacy LTE carrier) when the UE is operating in a dual connectivity mode. The base station may select the subset of beam directions for receiving SRS transmissions based on information in the feedback message 620. In one embodiment, the base station selects the subset of beam direction for receiving SRS transmissions based on indices in the feedback message 620. In such an embodiment, the indices may identify one or more of the beams used to transmit the beamformed reference signals 610. The number of beam directions in this subset, as well as the number of beams directions over which the base station can simultaneously receive SRS transmissions, may impact the number of SRS transmissions that need to be communicated over each beam by the UE.

The number of beam directions selected to be included into the subset may be determined based on a received signal quality threshold, a predetermined number of beam directions for SRS reception, and/or some other predefined rule. The set of beam directions available to the base station may include at least one beam direction that is excluded from the subset of beam directions selected for SRS reception. Next, the base station transmits a user specific SRS configuration message 630 to the UE. The user specific SRS configuration message 630 may carry an SRS configuration parameter that indicates how many SRS transmission opportunities have been allocated to the UE. The SRS configuration message 630 may also indicate beam directions the base station will use to receive the uplink SRS transmissions from the UE. Thereafter, the UE transmits uplink beamformed SRS messages 640 to the base station. The base station then selects, or otherwise generates, a beam (codebook or non-codebook) based on the received uplink SRS messages 640, and uses the selected/generated beam to transmit mmWave beamformed data transmissions 650 to the UE.

Figure 7:
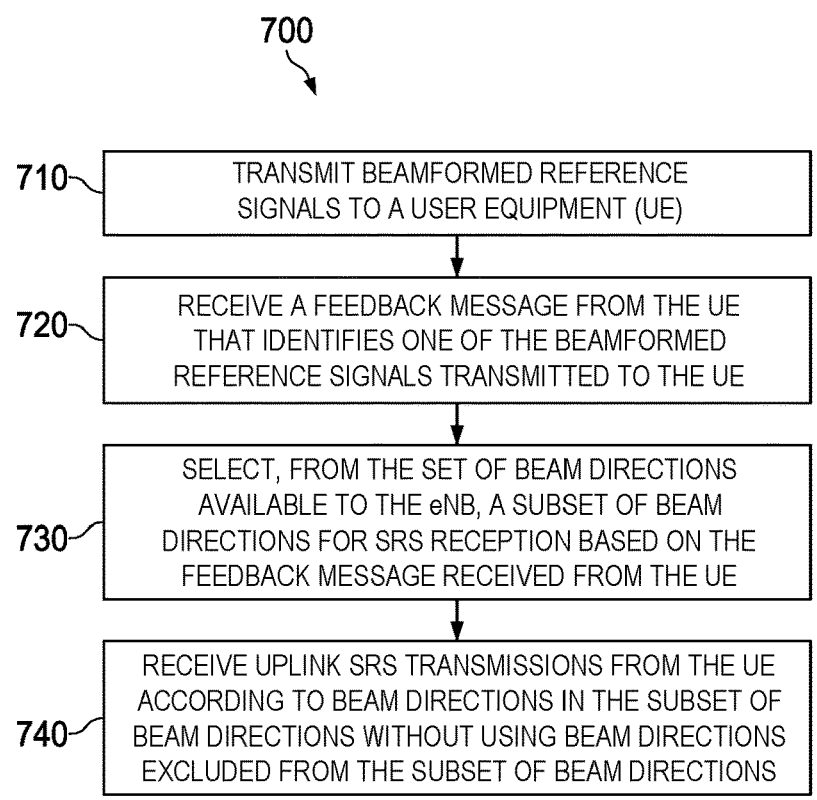
FIG. 7 illustrates a flowchart of an embodiment method for receiving beamformed SRS transmissions over a subset of beam directions.

FIG. 7 illustrates an embodiment method 700 for receiving beam-formed SRS transmissions, as may be performed by a base station. At step 710, the base station transmits one or more beam-formed reference signals to a UE. Each of the beam-formed reference signals may have been transmitted according to a different beam direction. At step 720, the base station receives a feedback message from the UE. The feedback message may identify at least one of the beam-formed reference signals transmitted to the UE.

At step 730, the base station selects a sub-set of beam directions for SRS reception from a set of beam directions available to the base station based on the feedback message received from the UE. The set of beam directions available to the base station may include at least one beam direction that is excluded from the subset of beam directions selected for SRS reception. At step 740, the base station receives uplink SRS transmissions from the UE according to beam directions in the subset of beam directions without using the at least one beam direction excluded from the subset of beam directions.

In an embodiment, the base station receives a UE generated SRS configuration message comprising a time/frequency flag that indicates whether or not SRS transmissions from different radio frequency (RF) chains of the UE are going to be multiplexed in the time-domain or the frequency domain. When uplink SRS signals transmitted from different RF chains of the UE are multiplexed in the time domain, the uplink SRS signals are transmitted one at a time over time resources assigned to the UE. When uplink SRS signals transmitted from different RF chains of the UE are multiplexed in the frequency domain, the uplink SRS signals are transmitted according to a frequency comb at the same time. The UE generated SRS configuration may comprise a beam index number for each assigned SRS sub-frame.

Figure 8A:
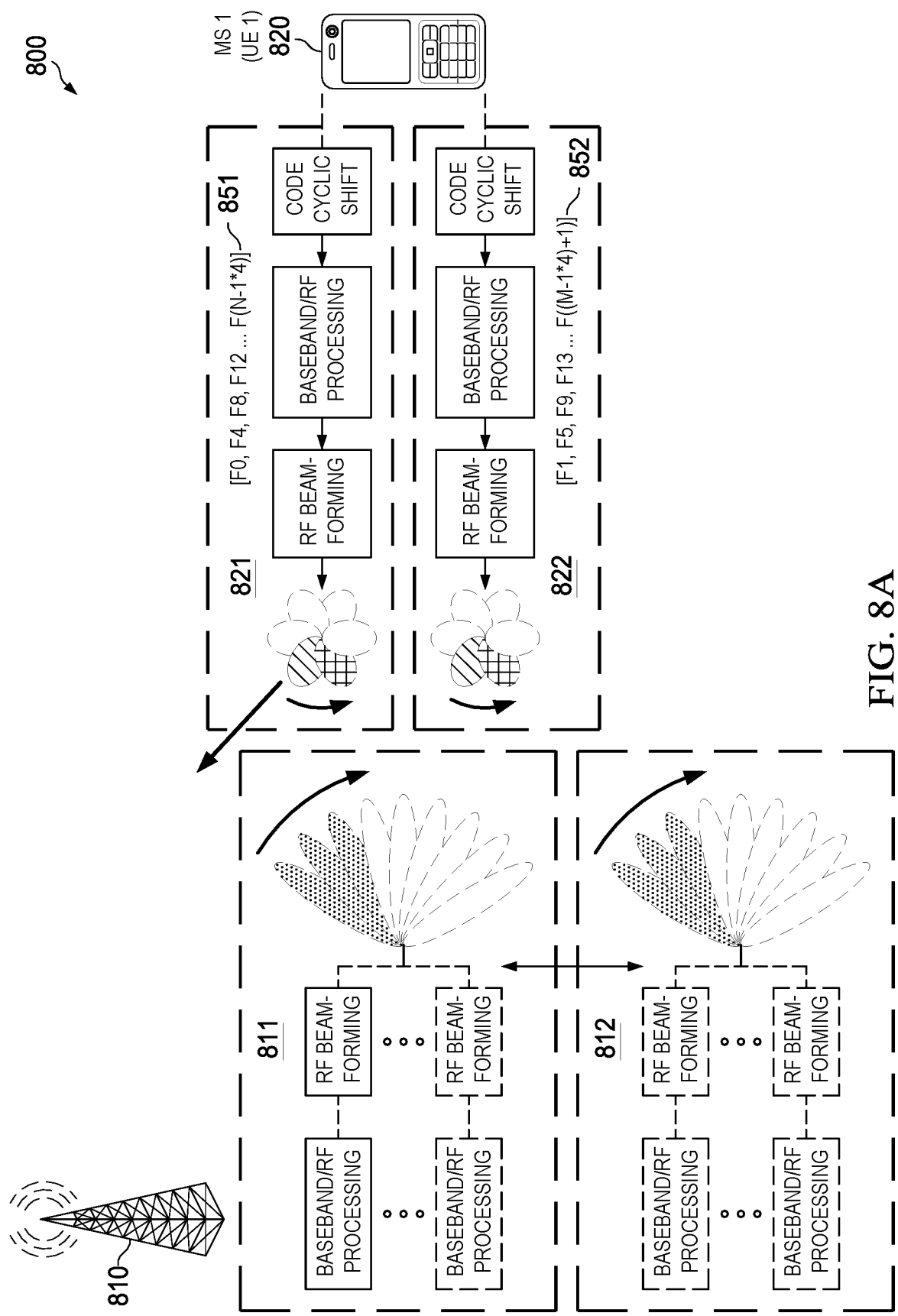
FIGS. 8A and 8B illustrate a diagram of another embodiment mmWave SRS transmission scheme.
Figure 8B:
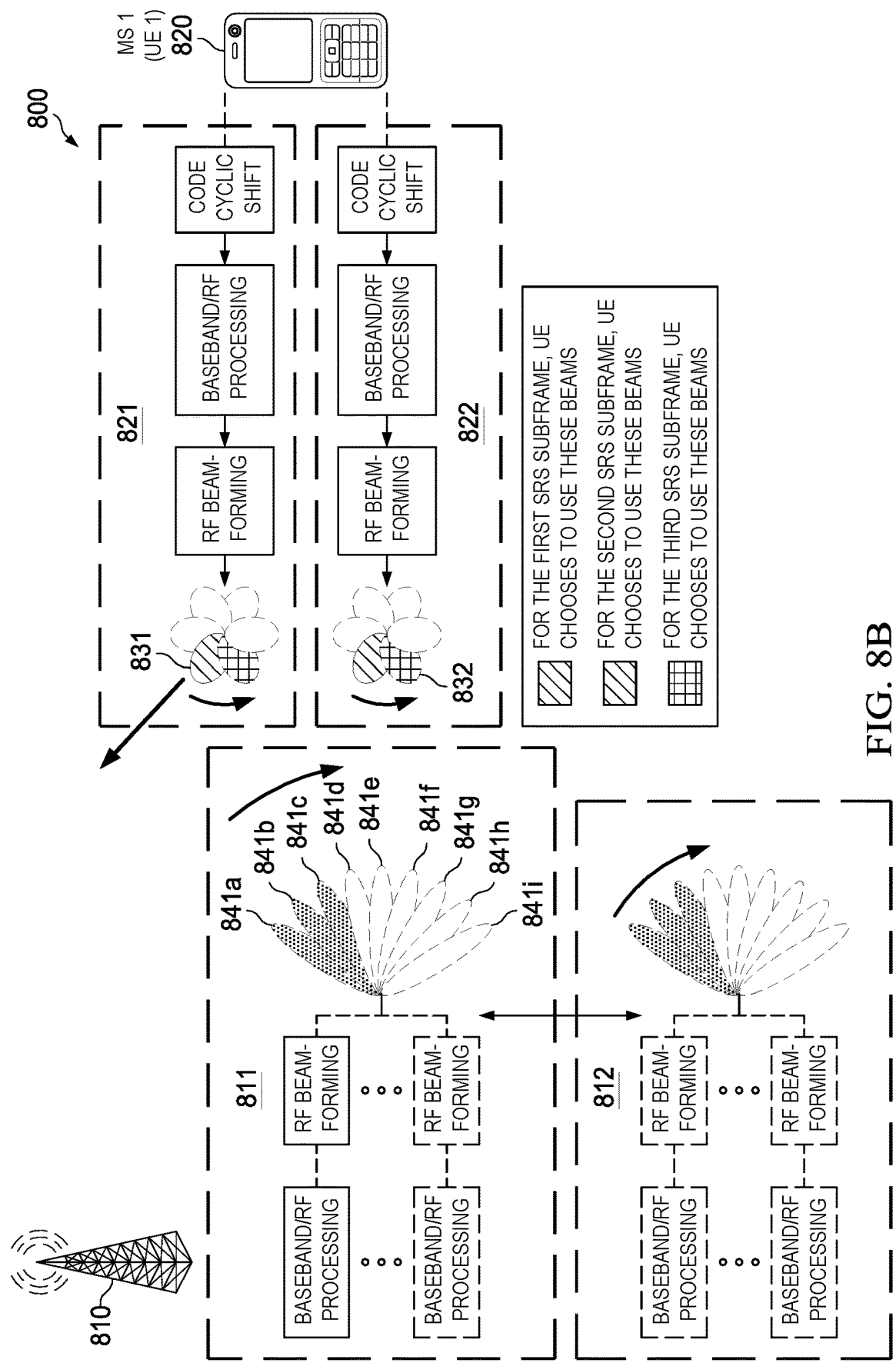

In some embodiments, a UE may perform SRS transmissions over multiple radio frequency (RF) chains. FIGS. 8A and 8B illustrate a diagram of an embodiment network 800 in which a UE 820 communicates SRS transmissions over two RF chains 821, 822 to a base station 81o. The base station 810 receives the SRS transmissions over two RF arrays 811, 812 at the same time. The RF arrays 811, 812 may be spatially separated. In this example, a set of nine beam directions are available to the base station 810, and a set of six beam directions are available to the UE 820 for each RF chain. The base station 810 can receive SRS transmission over three beam directions at the same time. Due to the high carrier frequencies used by mmWave signals, the RF chains 821, 822 may not be deemed "co-located" for purposes of channel estimation, and consequently the complex channel response from each RF chain at the UE to the base stations need to be separately estimated. Thus, the UE 820 may need to transmit three SRSs from each of the six beam directions over the RF chain 821, as well as three additional SRSs from each of the six beam directions over the RF chain 822 so that all combinations of beam directions between the set of six beam directions available to the UE 820 and the set of nine beam directions available to the base station 810 can be evaluated for each of the RF chains 821, 822. This would require that thirty-six SRS transmission opportunities be allocated to the UE 820. From this, it can be seen that embodiment techniques that use a subset of beam directions for transmitting and/or receiving SRS transmissions are particularly beneficial when multiple RF chains need to be evaluated.

Frequency combs may be used to separate simultaneous SRS transmissions over different RF chains in the frequency domain. In this example, the UE 820 uses a frequency comb 851 to communicate SRS transmissions over the RF chain 821, and a frequency comb 852 to communicate SRS transmissions over the RF chain 822. The frequency comb 851 specifies that SRS transmissions are communicated over every fourth subcarrier frequency with a sub-carrier offset of zero. Thus, SRS signals communicated over the RF chain 821 span F0, F4, F8, F12 . . . F((N−1*4)) subcarrier frequencies, where N is the number of SRS signals transmitted over the RF chain 821. The frequency comb 852 specifies that SRS signals are communicated over every fourth subcarrier frequency with a sub-carrier offset of one. Thus, SRSs signals communicated over the RF chain 822 span F1, F5, F9, F13 . . . F((M−1*4)+1) subcarrier frequencies, where M is the number of SRS signals transmitted over the RF chain 822. In some embodiments, M equals N.

Base stations may transmit SRS configuration messages to UEs that specify parameters for performing SRS transmissions. In one embodiment, the base station 810 transmits a cell-specific SRS configuration message to the UE 820. The cell-specific SRS configuration message carries an SRS configuration parameter that specifies a maximum number of UE beams which can be evaluated during the SRS session for each UE, a frequency comb spacing, and/or a number of times a beam direction needs to be re-transmitted. In this example, the SRS configuration parameter would specify two UE beam directions, a frequency comb spacing of four, and/or that each beam needs to be re-transmitted three times. In the same embodiment, or a different embodiment, the base station 810 transmits a UE-specific SRS configuration message to the UE 820. The UE-specific SRS configuration message carries an SRS configuration parameter that specifies a sub-carrier offset for the first RF chain of each UE and/or a code offset. In this example, the sub-carrier offset for the first RF chain 821 would be zero and the sub-carrier offset for the RF chain 822 would be one.

The UE 820 may select a subset of beam directions for SRS transmissions among the set of six beam directions based on the resources it has been allocated for SRS sounding which is communicated via the received SRS configuration message(s) and the beam which it has selected based on previously received from the base station 810. The UE 820 may also transmit a UE generated SRS configuration message to the base station 810 that includes a time/frequency flag that indicates whether or not SRS transmissions from different RF chains of the UE are going to be multiplexed in the time-domain or the frequency domain. In this case, the UE generated SRS configuration message indicates that SRS transmissions from different beam directions are multiplexed in the time domain.

In an embodiment, the UE 820 determines a mapping between the best beam direction(s) to use for uplink SRS transmissions to each of the beam directions available to the base station 810 for reception. As shown in FIG. 8B, the base station 810 informs the UE 820 which beams indices the base station 810 may listen on in each sub-frame, for example via a UE-specific SRS configuration message. For instance, the base station 810 informs the UE 820 that the UE 820 is assigned with three sub-frames for SRS transmissions and that the base station 810 listens on beam directions 841a, 841b, 841c in the first sub-frame, beam directions 841d, 841e, 841f in the second sub-frame, and beam directions 841g, 841h, 841i in the third sub-frame. The UE 820 may then use the beam direction 831 (for both RF chains 821 and 822) for SRS transmissions in the first two sub-frames and the beam direction 832 (for both RF chains 821 and 822) in the third sub-frame based on the mapping of beam directions available at the UE 820 and the beam directions available at the base station 810.

Figure 9:
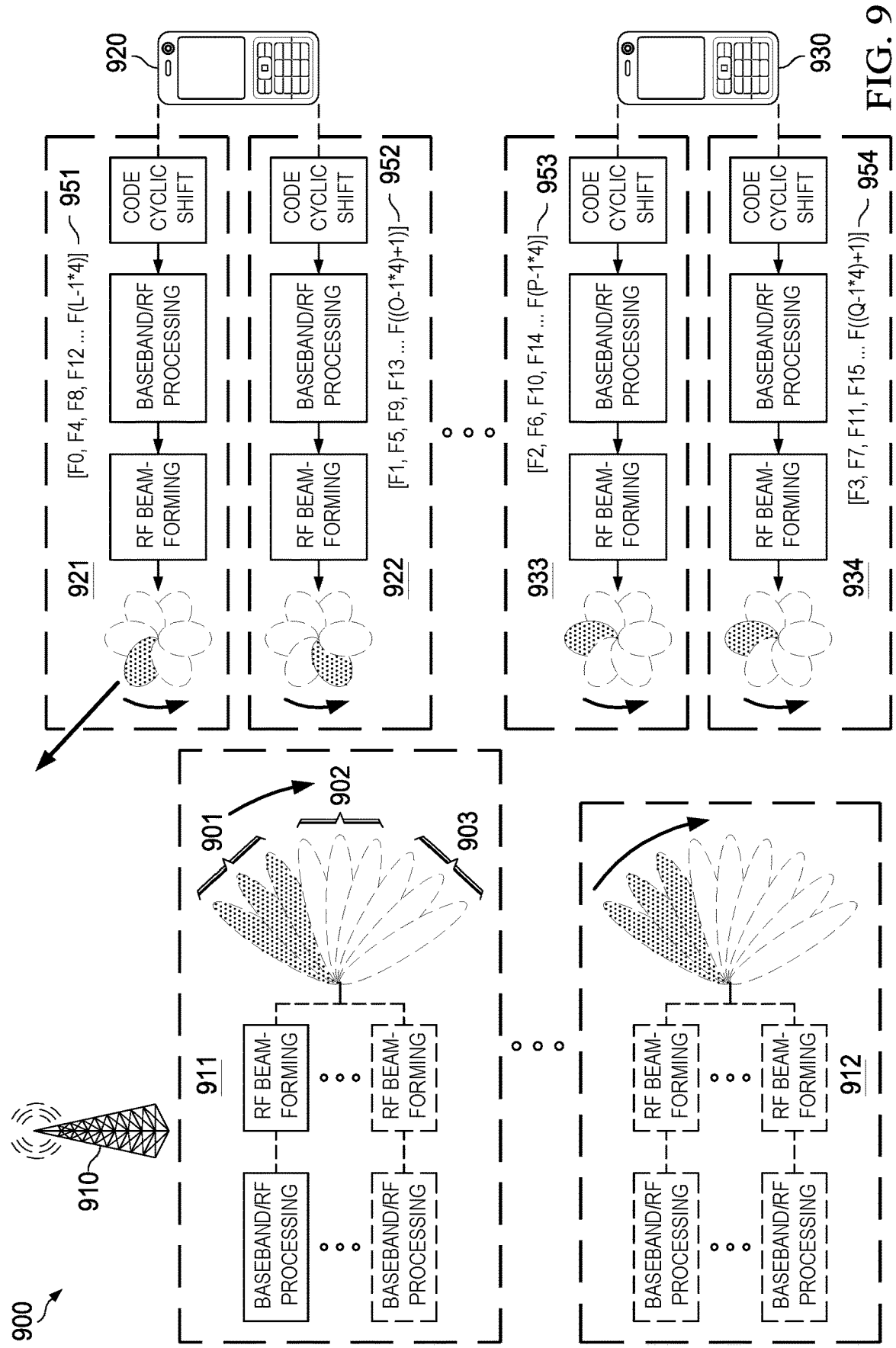
FIG. 9 illustrates a diagram of a yet another embodiment mmWave SRS transmission scheme.

Multiple UEs may be scheduled to perform SRS transmissions during the same time period with different sub-carriers according to the frequency comb. FIG. 9 illustrates a diagram of an embodiment network 900 in which UEs 920, 930 communicate SRS transmissions to a base station 910. In particular, The UE 920 communicates SRS transmissions over two RF chains 921, 922, and the UE 930 communicates SRS transmissions over two RF chains 933, 934. The base station 910 receives the SRS transmissions over two RF arrays 911, 912 at the same time. The RF arrays 911, 912 may be spatially separated.

In one example, frequency combs may be used to separate simultaneous SRS transmissions over the RF chains 921, 922, 933, 934. In such an example, the UE 920 may use a frequency comb 951 to perform SRS transmissions over the RF chain 921, and a frequency comb 952 to perform SRS transmissions over the RF chain 922, while the UE 930 may use a frequency comb 953 to perform SRS transmissions over the RF chain 933, and a frequency comb 934 to perform SRS transmissions over the RF chain 934. The frequency comb 951 specifies SRS transmissions are communicated over every fourth subcarrier frequency with a sub-carrier offset of zero, the frequency comb 952 specifies SRS transmissions are communicated over every fourth subcarrier frequency with a sub-carrier offset of one, the frequency comb 953 specifies SRS transmissions are communicated over every fourth subcarrier frequency with a sub-carrier offset of two, and the frequency comb 954 specifies SRS transmissions are communicated over every fourth subcarrier frequency with a sub-carrier offset of three. Thus, SRSs communicated over the RF chain 921 span F0, F4, F8, F12 . . . F (L−1*4) subcarrier frequencies (where L is the number of SRS signals transmitted over the RF chain 921) SRS signals communicated over the RF chain 922 span F1, F5, F9, F13 . . . F((O−1*4)+1) subcarrier frequencies (where O is the number of SRS signals transmitted over the RF chain 922), SRS messages communicated over the RF chain 933 span F2, F6, F10, F14 . . . F(P−1*4) subcarrier frequencies (where P is the number of SRS signals transmitted over the RF chain 933), and SRS messages communicated over the RF chain 934 span F3, F7, F11, F15 F((Q−1*4)+1) subcarrier frequencies (where Q is the number of SRS messages transmitted over the RF chain 934).

In another example, code cyclic shifts may be used to separate simultaneous SRS transmissions over the RF chains 921, 922, 933, 934. In such an example, the UE 920 may use a first cyclic shift to perform SRS transmissions over the RF chains 921, 922 while the UE 930 may use a second cyclic shift to perform SRS transmissions over the RF chains 933, 934. The UEs 920, 930 may use the same frequency comb while the UEs 920, 930 are separated by using different cyclic shifts.

Figure 10:
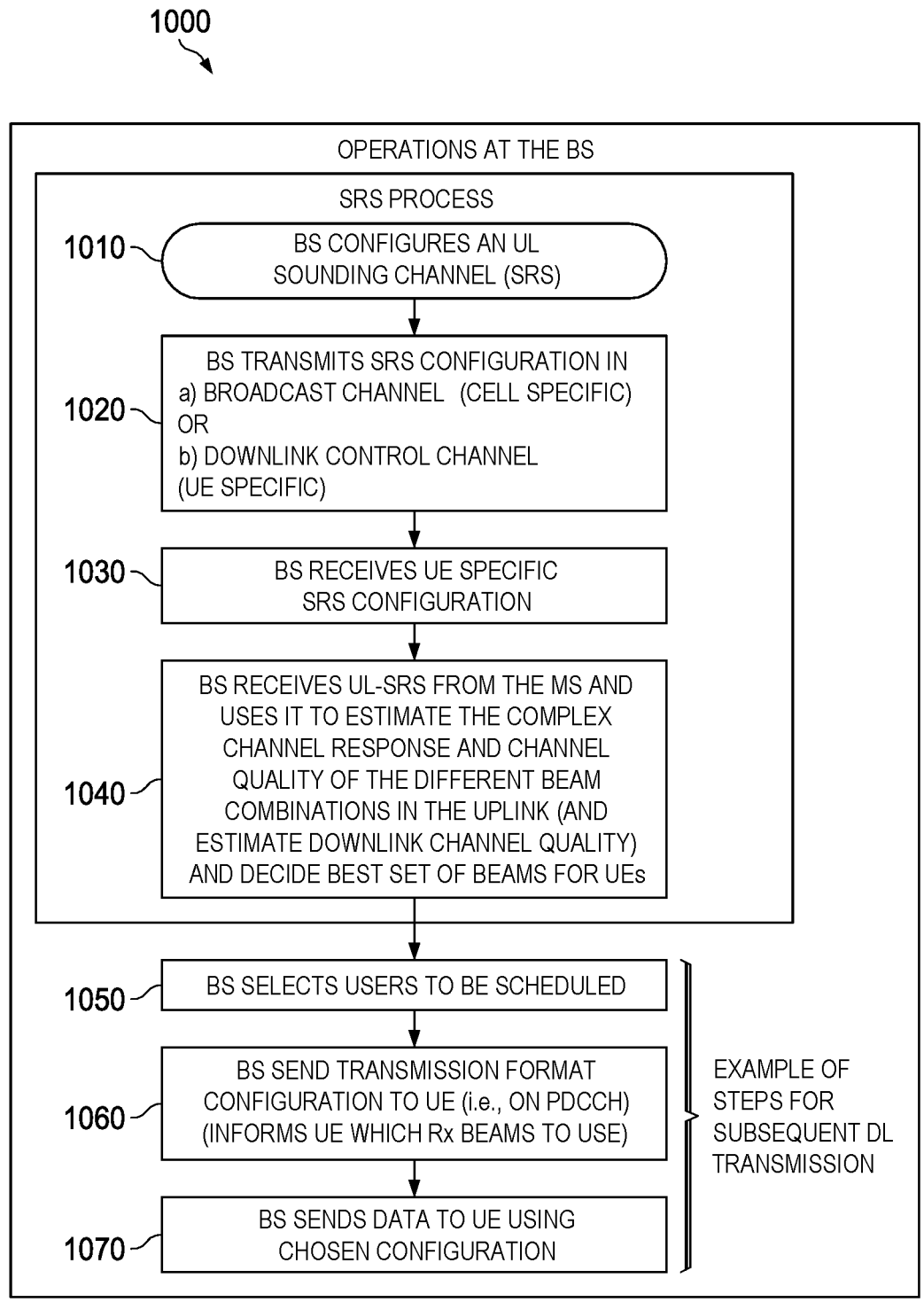
FIG. 10 illustrates a flowchart of an embodiment method for beamformed SRS communication.

FIG. 10 illustrates an embodiment flow diagram 1000 for the beamformed SRS, scheme as may be performed by a base station. At step 1010, the base station configures an uplink (UL) sounding channel for SRS. At step 1020, the base station transmits an SRS configuration message to a UE using a broadcast channel or using a downlink control channel. For example, the base station may transmit a cell-specific SRS configuration message in a broadcast channel to all of the UEs in the coverage area or it may transmit a UE-specific SRS configuration message in a downlink control channel to a specific UE. At step 1030, the base station receives a UE generated SRS configuration message from the UE. This UE generated SRS configuration message may comprise a time/frequency flag that indicates whether or not SRS transmissions from different radio frequency (RF) chains of the UE are going to be multiplexed in the time-domain or the frequency domain (using frequency comb). In some embodiments, step 1030 is omitted. At step 1040, the base station receives UL-SRS from the UE and uses it to estimate the complex channel response and channel quality of the different beam combinations in the uplink (and estimate downlink channel quality) and decide a best set of beams for each of a plurality of UEs that the base station serves. At step 1050, the base station selects UEs to be scheduled. At step 1060, the base station sends transmission format configuration to the UE. For instance, the base station may inform the UE which receive beams to use through the physical downlink shared channel (PDCCH). In some embodiments, the transmission format configuration indicates a transmission format without indicating which beams the UE should use. At step 1070, the base station sends data to the UE using the chosen configuration.

Figure 11:
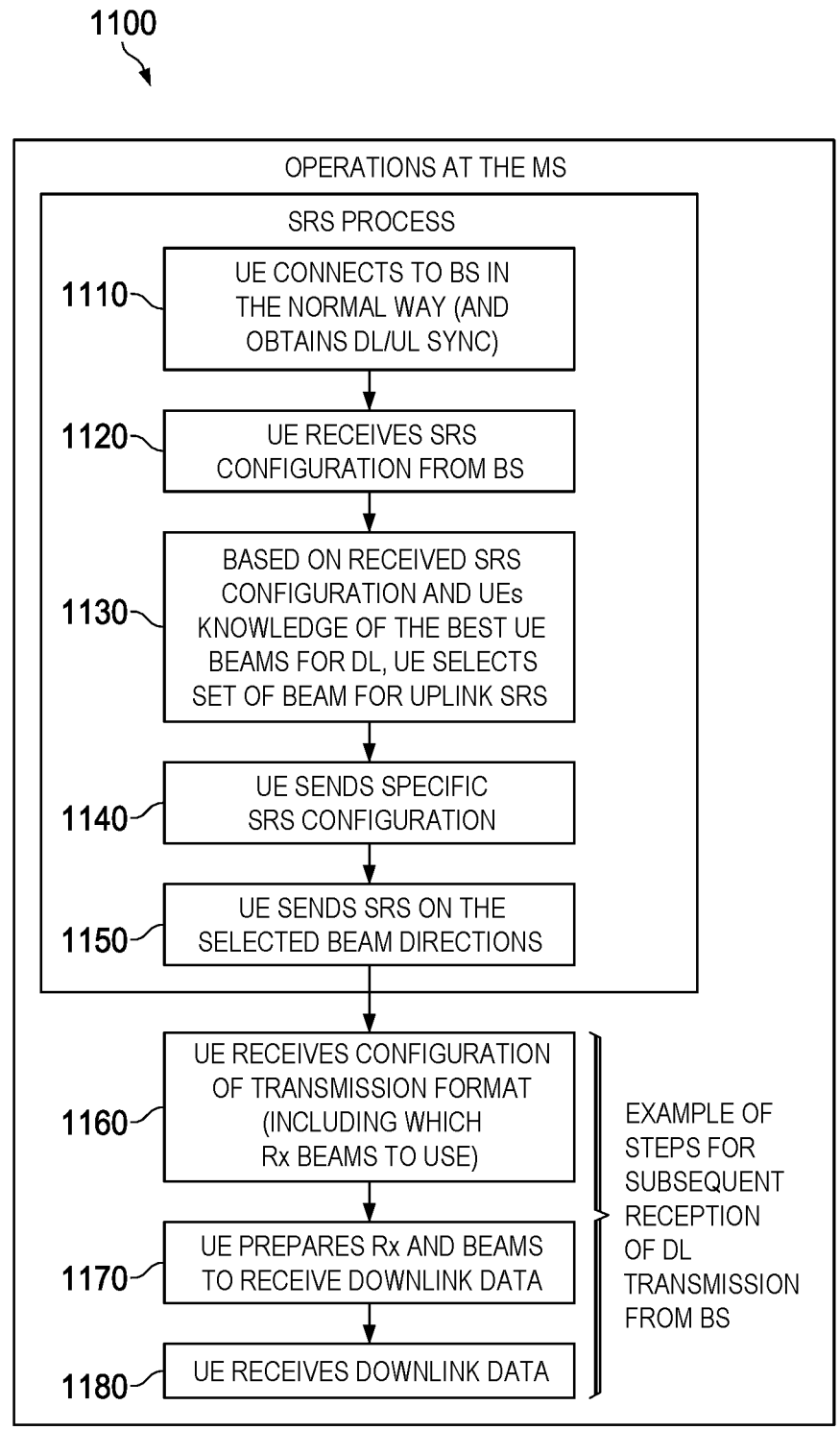
FIG. 11 illustrates a flowchart of an embodiment method for beamformed SRS communication.

FIG. 11 illustrates another embodiment flow diagram 1100 for the beamformed SRS scheme, as may be performed by a UE. At step 1110, the UE connects to a base station and obtains downlink (DL)/UL synchronization. At step 1120, the UE receives a cell-specific SRS configuration message from the BS. At step 1130, based on the received SRS configuration message and UE's knowledge of the best UE beams for DL transmission, the UE selects a set of beam directions for uplink SRS transmission. For example, the UE may select a subset of beam directions among all beam directions available to the UE based on its selection criteria and the received SRS configuration message which indicates the resources it has been allocated for uplink SRS. At step 1140, the UE sends a UE generated SRS configuration message to the base station. The UE generated SRS configuration message may comprise a time/frequency flag that indicates whether or not SRS transmissions from different radio frequency (RF) chains of the UE are going to be multiplexed in the time-domain or the frequency domain (using the frequency comb). In some embodiments, step 1140 is omitted. At step 1150, the UE sends SRS on the selected set of beam directions. At step 1160, the UE receives from the base station configuration information of transmission format that includes which receive beam directions to use. In some embodiments, the configuration information indicates a transmissions format without indicating which beam directions the UE should use. At step 1170, the UE prepares receive beam directions to receive downlink data. At step 1180, the UE receives downlink data from the base station using the selected beam directions.

Figure 12:
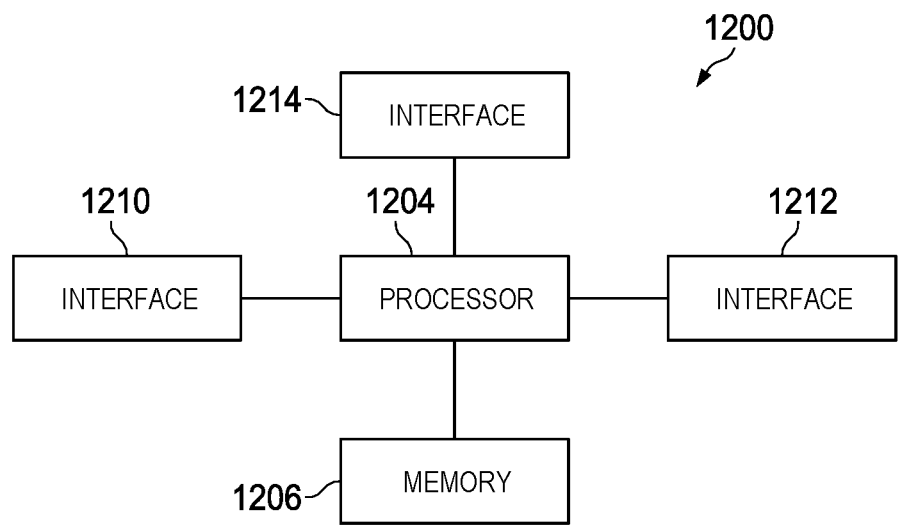
FIG. 12 illustrates a diagram of an embodiment processing system.

FIG. 12 illustrates a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 13:
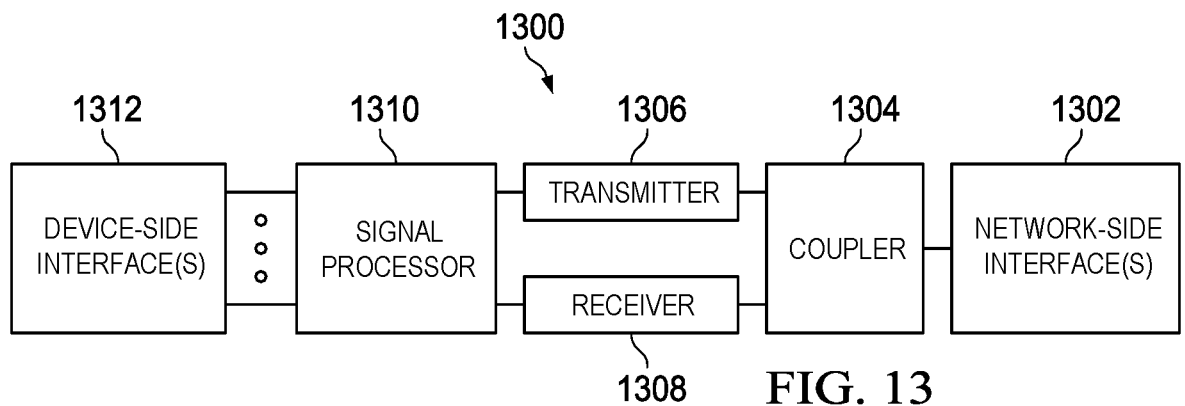
FIG. 13 illustrates a diagram of an embodiment transceiver.

In some embodiments, one or more of the interfaces 1210, 1212, 1214 connects the processing system 1200 to a transceiver adapted to transmit and receive signaling over the telecommunications network. FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 14:
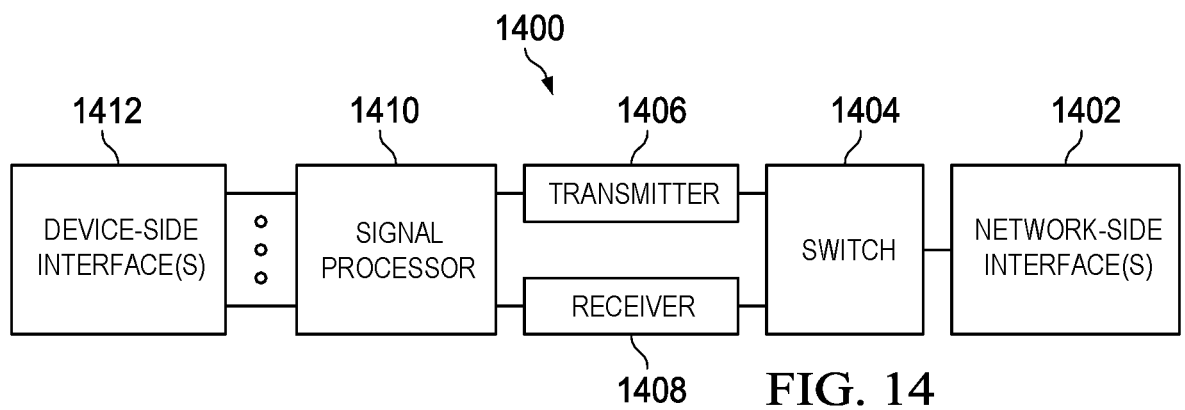
FIG. 14 illustrates a diagram of another embodiment transceiver.

FIG. 14 illustrates a block diagram of a transceiver 1400 adapted to transmit and receive signaling over a telecommunications network. As shown, the transceiver 1400 comprises a network-side interface 1402, a switch 1404, a transmitter 1406, a receiver 1408, a signal processor 1410, and a device-side interface 1412. The network-side interface 1402, the transmitter 1406, the receiver 1408, the signal processor 1410, and the device-side interface 1412 may be configured similarly to the network-side interface 1302, the transmitter 1306, the receiver 1308, the signal processor 1310, and the device-side interface 1312 (respectively) in the transceiver 1300. The switch 1404 may include any component or collection of components adapted to selectively interconnect the network-side interface 1402 to the transmitter 1406 or the receiver 1408 in a manner that enables time-division-duplexed (TDD) communication over a frequency resource.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
   receiving, by a user equipment (UE), a sounding reference signal (SRS) configuration parameter;
   receiving, by the UE from a base station, at least one downlink synchronization signal; and
   transmitting based on the SRS configuration parameter, by the UE, an uplink SRS using a beam parameter, the beam parameter being based on the at least one downlink synchronization signal.

2. The method of claim 1, wherein the beam parameter is from a set of candidate beam parameters, and wherein each beam parameter of the set of candidate beam parameters specifies a different beam direction.

3. The method of claim 1, wherein the beam parameter is from a set of candidate beam parameters, the method further comprising:
   selecting, by the UE from the set of candidate beam parameters, a subset of beam parameters for transmitting the uplink SRS based on the SRS configuration parameter and the at least one downlink synchronization signal, the subset of beam parameters including the beam parameter, the set of candidate beam parameters including at least one beam parameter excluded from the subset of beam parameters, the transmitting comprising:
   transmitting, by the UE to the base station, the uplink SRS without using the at least one beam parameter excluded from the subset of beam parameters.

4. The method of claim 3, the selecting the subset of beam parameters comprising:
   determining a number of SRS transmission opportunities for the UE based on the SRS configuration parameter; and selecting a number of beam parameters for inclusion in the subset of beam parameters based on the number of SRS transmission opportunities for the UE.

5. The method of claim 1, wherein the SRS configuration parameter is received in a cell-specific SRS configuration message, and wherein the SRS configuration parameter includes at least one of a maximum number of SRS sounding opportunities for different beams, a number of times each beam needs to be re-transmitted, or a frequency comb spacing.

6. A method comprising:
transmitting, by a base station to a user equipment (UE), a sounding reference signal (SRS) configuration parameter;
transmitting, by the base station to the UE, at least one downlink synchronization signal; and
receiving based on the SRS configuration parameter, by the base station, an uplink SRS using a beam parameter, the beam parameter being based on the at least one downlink synchronization signal.

7. The method of claim 6, wherein the beam parameter is from a set of candidate beam parameters, and wherein each beam parameter of the set of candidate beam parameters specifies a different beam direction.

8. The method of claim 6, wherein the beam parameter is from a set of candidate beam parameters, a subset of beam parameters including the beam parameter being selected from the set of candidate beam parameters based on the SRS configuration parameter and the at least one downlink synchronization signal, the set of candidate beam parameters including at least one beam parameter excluded from the subset of beam parameters, the receiving comprising:
receiving, by the base station, the uplink SRS without using the at least one beam parameter excluded from the subset of beam parameters.

9. The method of claim 8, a number of beam parameters for inclusion in the subset of beam parameters based on a number of SRS transmission opportunities for the UE, the number of SRS transmission opportunities based on the SRS configuration parameter.

10. The method of claim 6, wherein the SRS configuration parameter is transmitted in a cell-specific SRS configuration message, and wherein the SRS configuration parameter includes at least one of a maximum number of SRS sounding opportunities for different beams, a number of times each beam needs to be re-transmitted, or a frequency comb spacing.

11. The method of claim 1, the beam parameter being based on the at least one downlink synchronization signal comprising the beam parameter being based on reception of the at least one downlink synchronization signal.

12. A user equipment (UE) comprising:
at least one processor; and
a non-transitory computer readable storage medium storing programming, the programming including instructions that, when executed by the at least one processor, cause the UE to perform operations including:
receiving a sounding reference signal (SRS) configuration parameter;
receiving, from a base station, at least one downlink synchronization signal; and
transmitting, based on the SRS configuration parameter, an uplink SRS using a beam parameter, the beam parameter being based on the at least one downlink synchronization signal.

13. The UE of claim 11, wherein the beam parameter is from a set of candidate beam parameters, and wherein each beam parameter of the set of candidate beam parameters specifies a different beam direction.

14. The UE of claim 11, wherein the beam parameter is from a set of candidate beam parameters, the operations further comprising:
selecting, from the set of candidate beam parameters, a subset of beam parameters for transmitting the uplink SRS based on the SRS configuration parameter and the at least one downlink synchronization signal, the subset of beam parameters including the beam parameter, the set of candidate beam parameters including at least one beam parameter excluded from the subset of beam parameters, the transmitting comprising:
transmitting, to the base station, the uplink SRS without using the at least one beam parameter excluded from the subset of beam parameters.

15. The UE of claim 14, the selecting the subset of beam parameters comprising:
determining a number of SRS transmission opportunities for the UE based on the SRS configuration parameter; and
selecting a number of beam parameters for inclusion in the subset of beam parameters based on the number of SRS transmission opportunities for the UE.

16. The UE of claim 11, wherein the SRS configuration parameter is received in a cell-specific SRS configuration message, and wherein the SRS configuration parameter includes at least one of a maximum number of SRS sounding opportunities for different beams, a number of times each beam needs to be re-transmitted, or a frequency comb spacing.

17. A base station comprising:
at least one processor; and
a non-transitory computer readable storage medium storing programming, the programming including instructions that, when executed by the at least one processor, cause the base station to perform operations including:
transmitting, to a user equipment (UE), a sounding reference signal (SRS) configuration parameter;
transmitting, to the UE, at least one downlink synchronization signal; and
receiving, based on the SRS configuration parameter an uplink SRS using a beam parameter, the beam parameter being based on the at least one downlink synchronization signal.

18. The base station of claim 17, wherein the beam parameter is from a set of candidate beam parameters, and wherein each beam parameter of the set of candidate beam parameters specifies a different beam direction.

19. The base station of claim 17, wherein the beam parameter is from a set of candidate beam parameters, a subset of beam parameters including the beam parameter being selected from the set of candidate beam parameters based on the SRS configuration parameter and the at least one downlink synchronization signal, the set of candidate beam parameters including at least one beam parameter excluded from the subset of beam parameters, the receiving comprising:
receiving the uplink SRS without using the at least one beam parameter excluded from the subset of beam parameters.

20. The base station of claim 19, a number of beam parameters for inclusion in the subset of beam parameters based on a number of SRS transmission opportunities for the UE, the number of SRS transmission opportunities based on the SRS configuration parameter.

21. The base station of claim 17, wherein the SRS configuration parameter is transmitted in a cell-specific SRS configuration message, and wherein the SRS configuration parameter includes at least one of a maximum number of SRS sounding opportunities for different beams, a number of times each beam needs to be re-transmitted, or a frequency comb spacing.

* * * * *

UNITED STATES PATENT AND TRADEMARK OFFICE
CERTIFICATE OF CORRECTION

PATENT NO. : 11,888,665 B2
APPLICATION NO. : 17/990088
DATED : January 30, 2024
INVENTOR(S) : Richard Stirling-Gallacher et al.

Page 1 of 1

It is certified that error appears in the above-identified patent and that said Letters Patent is hereby corrected as shown below:

In the Claims

Claim 13, Column 15, Line 66; delete "claim 11" and insert --claim 12--.

Claim 14, Column 16, Line 3; delete "claim 11" and insert --claim 12--.

Claim 16, Column 16, Line 26; delete "claim 11" and insert --claim 12--.

Signed and Sealed this
Thirteenth Day of August, 2024

Katherine Kelly Vidal
*Director of the United States Patent and Trademark Office*